US 11,552,936 B2

(12) United States Patent
Call et al.

(10) Patent No.: US 11,552,936 B2
(45) Date of Patent: *****Jan. 10, 2023

(54) MANAGEMENT OF DYNAMIC CREDENTIALS

(71) Applicant: Shape Security, Inc., Mountain View, CA (US)

(72) Inventors: Justin Call, Santa Clara, CA (US); Subramanian Varadarajan, San Jose, CA (US); Bryan Hanks, San Jose, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 15/658,129

(22) Filed: Jul. 24, 2017

(65) Prior Publication Data

US 2017/0324722 A1    Nov. 9, 2017

Related U.S. Application Data

(63) Continuation of application No. 14/738,913, filed on Jun. 14, 2015, now Pat. No. 9,716,702, which is a
(Continued)

(51) Int. Cl.
*G06F 21/44* (2013.01)
*H04L 9/08* (2006.01)
(Continued)

(52) U.S. Cl.
CPC .............. *H04L 63/08* (2013.01); *G06F 21/44* (2013.01); *H04L 9/008* (2013.01); *H04L 9/0891* (2013.01);
(Continued)

(58) Field of Classification Search
CPC . H04L 63/08; H04L 63/0846; H04L 63/1441; H04L 63/1466; H04L 63/162;
(Continued)

(56) References Cited

U.S. PATENT DOCUMENTS

| 5,974,549 A | 10/1999 | Golan |
| 6,401,077 B1 | 6/2002 | Godden et al. |

(Continued)

FOREIGN PATENT DOCUMENTS

| CN | 101471818 A | 7/2009 |
| CN | 101471818 | 5/2011 |

(Continued)

OTHER PUBLICATIONS

"Do DOM: Levraging DOM Invariants for Web 2.0 Application Reliability" - Zorn et al., Microsoft Research, Nov. 4, 2010 https://www.microsoft.com/en-US/research/wp-content/uploads/201 6/02/DoDOM-tr.pdf (Year: 2010).*

(Continued)

*Primary Examiner* — Randy A Scott
(74) *Attorney, Agent, or Firm* — Troutman Pepper Hamilton Sanders LLP (Rochester)

(57) ABSTRACT

In an embodiment, a method comprises intercepting, from a first computer, a first set of instructions that define one or more original operations, which are configured to cause one or more requests to be sent if executed by a client computer; modifying the first set of instructions to produce a modified set of instructions, which are configured to cause a credential to be included in the one or more requests sent if executed by the client computer; rendering a second set of instructions comprising the modified set of instructions and one or more credential-morphing-instructions, wherein the one or more credential-morphing-instructions define one or more credential-morphing operations, which are configured to cause the (Continued)

client computer to update the credential over time if executed; sending the second set of instructions to a second computer.

20 Claims, 7 Drawing Sheets

Related U.S. Application Data continuation of application No. 14/290,835, filed on May 29, 2014, now Pat. No. 9,083,739.

(51) Int. Cl.
  *H04L 9/00* (2022.01)
  *H04L 29/06* (2006.01)
  *H04L 9/40* (2022.01)
  *H04L 29/08* (2006.01)

(52) U.S. Cl.
  CPC ...... *H04L 63/0846* (2013.01); *H04L 63/1441* (2013.01); *H04L 63/1466* (2013.01); *H04L 63/162* (2013.01); *H04L 2463/144* (2013.01)

(58) Field of Classification Search
  CPC . H04L 9/008; H04L 9/0891; H04L 2463/144; G06F 21/44
  See application file for complete search history.

(56) References Cited

U.S. PATENT DOCUMENTS

| | | | |
|---|---|---|---|
| 6,606,663 B1 | 8/2003 | Liao et al. | |
| 6,938,170 B1* | 8/2005 | Kraft | G06F 21/62 707/999.005 |
| 7,117,429 B2 | 10/2006 | Vedullapalli et al. | |
| 7,174,565 B2 | 2/2007 | Kadyk et al. | |
| 7,180,895 B2 | 2/2007 | Smith | |
| 7,191,467 B2 | 3/2007 | Dujari et al. | |
| 7,334,254 B1 | 2/2008 | Boydstun et al. | |
| 7,464,326 B2 | 12/2008 | Kawai et al. | |
| 7,500,099 B1 | 3/2009 | McElwee et al. | |
| 7,694,335 B1 | 4/2010 | Turner et al. | |
| 7,707,223 B2 | 4/2010 | Zubenko et al. | |
| 7,895,653 B2 | 2/2011 | Calo et al. | |
| 8,015,301 B2 | 9/2011 | Carter et al. | |
| 8,020,193 B2 | 9/2011 | Bhola et al. | |
| 8,086,957 B2 | 12/2011 | Bauchot et al. | |
| 8,132,242 B1 | 3/2012 | Wu | |
| 8,145,909 B1 | 3/2012 | Agrawal | |
| 8,196,189 B2* | 6/2012 | Roskind | G06F 21/31 380/255 |
| 8,225,401 B2 | 7/2012 | Sobel et al. | |
| 8,266,202 B1 | 9/2012 | Colton et al. | |
| 8,266,243 B1 | 9/2012 | Carlson et al. | |
| 8,312,520 B2* | 11/2012 | Baumhof | G06F 21/56 726/6 |
| 8,332,952 B2 | 12/2012 | Zhang et al. | |
| 8,347,396 B2 | 1/2013 | Grigsby et al. | |
| 8,392,576 B1 | 3/2013 | Henderson | |
| 8,401,522 B2* | 3/2013 | Crawford | G06F 21/31 455/410 |
| 8,473,620 B2 | 6/2013 | Demmer et al. | |
| 8,516,080 B2 | 8/2013 | Chow et al. | |
| 8,527,417 B2* | 9/2013 | Telle | G06Q 20/385 705/35 |
| 8,527,774 B2 | 9/2013 | Fallows et al. | |
| 8,533,480 B2 | 9/2013 | Pravetz et al. | |
| 8,533,796 B1* | 9/2013 | Shenoy | H04L 63/0815 380/229 |
| 8,555,385 B1 | 10/2013 | Bhatkar et al. | |
| 8,555,388 B1 | 10/2013 | Wang et al. | |
| 8,627,479 B2 | 1/2014 | Wittenstein et al. | |
| 8,990,933 B1 | 3/2015 | Magdalin | |
| 9,083,739 B1 | 7/2015 | Call et al. | |
| 9,087,187 B1 | 7/2015 | Doane | |
| 9,092,782 B1 | 7/2015 | Zaslaysky et al. | |
| 9,122,865 B2* | 9/2015 | Ho | G06F 21/42 |
| 9,232,338 B1 | 1/2016 | Henry et al. | |
| 9,241,004 B1 | 1/2016 | April | |
| 9,294,458 B2 | 3/2016 | Singh et al. | |
| 9,397,989 B1* | 7/2016 | Ramalingam | H04L 63/0884 |
| 9,680,850 B2 | 6/2017 | Rapaport et al. | |
| 9,807,087 B2 | 10/2017 | Hinton | |
| 9,967,236 B1 | 5/2018 | Ashley et al. | |
| 10,051,001 B1 | 8/2018 | Ashley et al. | |
| 10,262,129 B1 | 4/2019 | Gupta | |
| 10,523,686 B1 | 12/2019 | Mehta et al. | |
| 11,005,839 B1 | 5/2021 | Shahidzadeh et al. | |
| 2002/0099827 A1 | 7/2002 | Shah et al. | |
| 2002/0188631 A1 | 12/2002 | Tiemann et al. | |
| 2002/0191786 A1* | 12/2002 | Marroquin | H04L 9/0662 380/42 |
| 2003/0217287 A1 | 11/2003 | Kruglenko | |
| 2004/0162994 A1 | 8/2004 | Cohen et al. | |
| 2004/0245525 A1 | 12/2004 | Yamazaki et al. | |
| 2005/0108562 A1 | 5/2005 | Khazan et al. | |
| 2005/0114705 A1* | 5/2005 | Reshef | G06Q 20/403 726/4 |
| 2005/0182958 A1 | 8/2005 | Pham | |
| 2006/0031855 A1 | 2/2006 | Smithline | |
| 2006/0085643 A1 | 4/2006 | Philips | |
| 2006/0155869 A1 | 7/2006 | Nanduri et al. | |
| 2006/0282897 A1 | 12/2006 | Sima et al. | |
| 2007/0011295 A1 | 1/2007 | Hansen | |
| 2007/0043947 A1 | 2/2007 | Mizikovsky et al. | |
| 2007/0130463 A1* | 6/2007 | Law | G06F 21/34 713/168 |
| 2007/0186106 A1 | 8/2007 | Ting et al. | |
| 2007/0283154 A1 | 12/2007 | Zhang et al. | |
| 2008/0183902 A1 | 7/2008 | Cooper et al. | |
| 2008/0222736 A1 | 9/2008 | Boodaei et al. | |
| 2008/0320586 A1 | 12/2008 | Hrabik et al. | |
| 2009/0007243 A1* | 1/2009 | Boodaei | H04L 9/3226 726/5 |
| 2009/0099988 A1 | 4/2009 | Stokes et al. | |
| 2009/0104888 A1* | 4/2009 | Cox | G06F 21/31 455/410 |
| 2009/0119504 A1 | 5/2009 | Van Os et al. | |
| 2009/0144829 A1 | 6/2009 | Grigsby et al. | |
| 2009/0193513 A1 | 7/2009 | Agarwal et al. | |
| 2009/0241174 A1* | 9/2009 | Rajan | G06F 21/31 715/863 |
| 2009/0292984 A1 | 11/2009 | Bauchot et al. | |
| 2009/0307135 A1 | 12/2009 | Gupta et al. | |
| 2009/0327138 A1 | 12/2009 | Mardani et al. | |
| 2009/0328142 A1 | 12/2009 | Wang et al. | |
| 2010/0031315 A1 | 2/2010 | Feng et al. | |
| 2010/0037298 A1 | 2/2010 | Lottin | |
| 2010/0100927 A1 | 4/2010 | Bhola et al. | |
| 2010/0107245 A1 | 4/2010 | Jakubowski et al. | |
| 2010/0115594 A1 | 5/2010 | Paya et al. | |
| 2010/0125612 A1 | 5/2010 | Amradkar et al. | |
| 2010/0186089 A1 | 7/2010 | Fu et al. | |
| 2010/0191962 A1 | 7/2010 | Yan et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan et al. | |
| 2010/0306547 A1* | 12/2010 | Fallows | G06F 21/305 713/178 |
| 2011/0047169 A1 | 2/2011 | Leighton et al. | |
| 2011/0131416 A1 | 6/2011 | Schneider | |
| 2011/0154021 A1 | 6/2011 | McCann et al. | |
| 2011/0178973 A1 | 7/2011 | Lopez et al. | |
| 2011/0239113 A1 | 9/2011 | Hung et al. | |
| 2011/0283110 A1 | 11/2011 | Dapkus et al. | |
| 2011/0296391 A1 | 12/2011 | Gass et al. | |
| 2011/0302424 A1 | 12/2011 | Horne et al. | |
| 2011/0302623 A1 | 12/2011 | Ricci | |
| 2011/0314091 A1 | 12/2011 | Podjarny | |
| 2011/0320816 A1 | 12/2011 | Yao et al. | |
| 2012/0011262 A1 | 1/2012 | Cheng et al. | |

(56) References Cited

U.S. PATENT DOCUMENTS

| | | |
|---|---|---|
| 2012/0022942 A1 | 1/2012 | Holloway et al. |
| 2012/0023394 A1 | 1/2012 | Pieczul et al. |
| 2012/0059742 A1 | 3/2012 | Katzin et al. |
| 2012/0090030 A1 | 4/2012 | Rapaport et al. |
| 2012/0096116 A1 | 4/2012 | Mislove et al. |
| 2012/0110469 A1 | 5/2012 | Magarshak |
| 2012/0110668 A1 | 5/2012 | Schechter et al. |
| 2012/0117649 A1 | 5/2012 | Holloway et al. |
| 2012/0124372 A1 | 5/2012 | Dilley et al. |
| 2012/0173870 A1 | 7/2012 | Reddy et al. |
| 2012/0198528 A1 | 8/2012 | Baumhof |
| 2012/0216251 A1 | 8/2012 | Kumar et al. |
| 2012/0278487 A1 | 11/2012 | Woelfel |
| 2012/0297484 A1 | 11/2012 | Srivastava |
| 2012/0311715 A1 | 12/2012 | Tai et al. |
| 2013/0007849 A1 | 1/2013 | Coulter et al. |
| 2013/0007869 A1 | 1/2013 | Thomas |
| 2013/0036468 A1 | 2/2013 | Georgiev |
| 2013/0055287 A1 | 2/2013 | Pope et al. |
| 2013/0061055 A1 | 3/2013 | Schibuk |
| 2013/0091425 A1 | 4/2013 | Hughes et al. |
| 2013/0091582 A1 | 4/2013 | Chen et al. |
| 2013/0173782 A1 | 7/2013 | Ragutski et al. |
| 2013/0198607 A1 | 8/2013 | Mischook et al. |
| 2013/0219256 A1 | 8/2013 | Lloyd et al. |
| 2013/0219492 A1 | 8/2013 | Call et al. |
| 2013/0227099 A1 | 8/2013 | Hinton et al. |
| 2013/0227397 A1 | 8/2013 | Tvorun et al. |
| 2013/0232234 A1 | 9/2013 | Kapur et al. |
| 2013/0232343 A1 | 9/2013 | Horning et al. |
| 2013/0239195 A1 | 9/2013 | Turgeman |
| 2013/0263264 A1 | 10/2013 | Klein et al. |
| 2013/0340043 A1 | 12/2013 | Zarei et al. |
| 2014/0040787 A1 | 2/2014 | Mills et al. |
| 2014/0053059 A1 | 2/2014 | Weber et al. |
| 2014/0089786 A1 | 3/2014 | Hashmi |
| 2014/0130182 A1 | 5/2014 | Yackanich et al. |
| 2014/0189359 A1 | 7/2014 | Marien et al. |
| 2014/0189808 A1 | 7/2014 | Mahaffey et al. |
| 2014/0201532 A1 | 7/2014 | Toy et al. |
| 2014/0223175 A1 | 8/2014 | Bhatnagar |
| 2014/0237564 A1 | 8/2014 | Dudziak et al. |
| 2014/0245372 A1* | 8/2014 | Elias ............... G06F 21/6218 726/1 |
| 2014/0250514 A1 | 9/2014 | Blomquist et al. |
| 2014/0259145 A1 | 9/2014 | Khandelwal et al. |
| 2014/0282961 A1 | 9/2014 | Dorfman et al. |
| 2015/0089621 A1 | 3/2015 | Khalid et al. |
| 2015/0134956 A1 | 5/2015 | Stachura et al. |
| 2015/0271188 A1 | 9/2015 | Call et al. |
| 2015/0350181 A1 | 12/2015 | Call et al. |
| 2015/0381376 A1 | 12/2015 | Wardman et al. |
| 2016/0044034 A1 | 2/2016 | Spilman |
| 2016/0050231 A1 | 2/2016 | Varadarajan et al. |
| 2016/0063463 A1 | 3/2016 | Min et al. |
| 2016/0080355 A1 | 3/2016 | Greenspan et al. |
| 2016/0094575 A1 | 3/2016 | Shekyan et al. |
| 2016/0147992 A1 | 5/2016 | Zhao et al. |
| 2016/0197907 A1 | 7/2016 | Bajenov et al. |
| 2016/0262021 A1 | 9/2016 | Lee et al. |
| 2016/0275274 A1 | 9/2016 | Eun |
| 2016/0294796 A1 | 10/2016 | Hidayat et al. |
| 2017/0033936 A1 | 2/2017 | Cidon et al. |
| 2017/0063831 A1 | 3/2017 | Arnold et al. |
| 2017/0111358 A1 | 4/2017 | Hall |
| 2017/0346797 A1 | 11/2017 | Yedidi et al. |
| 2017/0346851 A1 | 11/2017 | Drake et al. |
| 2018/0006814 A1 | 1/2018 | Schroeder et al. |
| 2018/0046796 A1 | 2/2018 | Wright et al. |
| 2018/0091492 A1 | 3/2018 | Hidayat et al. |
| 2018/0131685 A1 | 5/2018 | Sridhar |
| 2018/0191688 A1 | 7/2018 | Chen |
| 2018/0241728 A1 | 8/2018 | Burgess et al. |
| 2018/0241774 A1 | 8/2018 | Zhao |
| 2018/0351747 A1 | 12/2018 | Spangemacher et al. |
| 2019/0007387 A1 | 1/2019 | Jin |
| 2019/0007428 A1 | 1/2019 | Moen |
| 2019/0068638 A1 | 2/2019 | Bartik et al. |
| 2019/0182251 A1 | 6/2019 | Jampani |
| 2019/0312859 A1 | 10/2019 | Yang |
| 2020/0067861 A1 | 2/2020 | Leddy et al. |
| 2020/0201854 A1 | 6/2020 | Miller |
| 2020/0210745 A1 | 7/2020 | Luo et al. |
| 2020/0259817 A1 | 8/2020 | Natarajan |
| 2020/0389319 A1 | 12/2020 | Wise |
| 2021/0176275 A1 | 6/2021 | Celik |

FOREIGN PATENT DOCUMENTS

| | | | |
|---|---|---|---|
| GB | 2443093 A | 4/2008 | |
| WO | 1999064967 A1 | 12/1999 | |
| WO | 2002088951 A1 | 11/2002 | |
| WO | 2004109532 A1 | 12/2004 | |
| WO | WO-2008032916 A1 * | 3/2008 | ............ G06F 21/31 |
| WO | 2008095018 A2 | 8/2008 | |
| WO | 2008095031 A1 | 8/2008 | |
| WO | 2008130946 A2 | 10/2008 | |
| WO | WO-2011071423 A1 * | 6/2011 | ........... H04L 12/282 |
| WO | WO2011071423 A1 | 6/2011 | |
| WO | 2013091709 A1 | 6/2013 | |

OTHER PUBLICATIONS

"Cujo: Efficient Detection and Prevention of Drive-by-Download Attacks" - Rieck et al., Machine Learning Group, Technische Univ., Intelligent Data Analysis Fraunhofer Inst. FIRST, Laboratory Dependable Distributed Sys, Dec. 10, 2010 https://user.informatik.uni-goettingen.de/~krieck/docs/2010-acsac.pdf (Year: 2010).*

CTNF, mailed on Jun. 5, 2019, re: Justin Call, U.S. Appl. No. 15/658,129, filed Jul. 24, 2017.

PCT/US2018/040499, International Search Report, dated Nov. 9, 2018, Shape or.

CTNF, mailed on Sep. 24, 2019, re: Ganesh Jampani, U.S. Appl. No. 16/259,890, filed Jan. 28, 2019.

Anderson et al., "Measuring the Cost of Cybercrime," 2012 Workshop on the Economics of Information Security (WEIS), [retrieved on Oct. 15, 2013].

Boston University Information Services & Technology [online]. "Understanding Authentication, Authorization, and Encryption," www.bu.edu/tech/services/security/resources/bestpractice/auth, Jul. 2014, 4 pages.

Claims in application No. PCT/US2016/018081, dated Apr. 2016, 6 pages.

CodeSealer, "CodeSealer," codesealer.com [online] 2013 http://web.archive.org/web/20130829165031http://codesealer.com/technology.html>, 1 page.

Cova et al., "Detection and Analysis of Drive-by-Download Attacks and Malicious JavaScript Code," World Wide Web Conference Committee, Apr. 26-30, 2010. 10 pages.

Currie et al., In-the-Wire Authentication: Protecting Client-Side Critical Data Fileds in Secure Network Transactions, dated 2009 2nd International Con. Adapt. Science &Tech. IEEE, pp. 232-237.

D. Kristol, "HTTP State Management Mechanism", RFC 2965, IETF, dated Oct. 2000, 26 pages.

Dougan et al., International Journal of Ambient Computing and Intelligence, dated Jan.-Mar. 2012, pp. 29-39.

Egele et al., "Defending Browsers against Drive-by Downloads: Mitigating Heapspraying Code Injection Attacks,"Detection of Intrusions and Malware and Vulnerability Asses. Lecture, dated 2009; 19 pages.

Entrust, "Defeating Man-in-the-Browser Malware," Entrust.com [online] Sep. 2012 [retrieved Oct. 15, 2013]., Http://download.entrust.com/resources/download.cfm/24002/>, 18 pages.

Google Search, "Google Patents Search Results" dated May 21, 2014, 2 pages.

H. Krawczyk, "HMAC-Based Extract-And-Expand Key Derivation Function, (Hkdf)", RFC 5869, IETF, May 2010, 14 pages.

(56) References Cited

OTHER PUBLICATIONS

Indiana University [online], "Authentication vs. Authorization," published before Jul. 1, 2014, Internet: <URL: https://protect.iu.edu/cybersecurity/authn-authz>. 2 pages.

IP.com, "Search Results", Patents and Applications, http://ip/com/search/results.html, dated May 6, 2014, 2 pages.

Krebs on Security, In-depth security news and investigation, "A Closer Look at Rapportfrom Trusteer", dated Apr. 29, 2010, 16 pages.

Marcus and Sherstobitoff, "Dissecting Operation High Roller," McAfee [online] 2012 [retrieved on Oct. 15, 2013], http://www.mcafee.com/us/resources/reports/rpoperationhigh-roller.pdf>, 20 pages.

Oh, "Recent Java exploitation trends and malware," Black Hat USA 2012,:https://media.blackhat.com/bh-us-12/Briefings/Oh/BH_US_12_Oh_Recent_Java_Exploitation_Trends_and_Malware_WP.pdf>, 27 pages.

Rieck et al., "Cujo: Efficient Detection and Prevention of Drive-by-Download Attacks",ACSAC, Dated Dec. 2010, 9 pages.

RSA, "RSA Offers Advanced Solutions to Help Combat Man-In-The-Browser Attacks,",rsa.com [online] May 18, 2010, web.archive.org/web/20111111123108/, 3 pages.

Rutkowska, "Rootkits vs. Stealth by Design Malware," Black Hat Europe, 2006. Retrieved from the Internet: <URL http://www.blackhat.com/presentations/bheurope-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013], 5 pages.

Shackleford, D. "Application Whitelisting: Enhancing Host Security," SANS Institute Reading Room, Oct. 2009, 16 pages.

Sood and Enbody, "A Browser Malware Taxonomy," Virus Bulletin, Jun. 2011. Retrieved from the Internet <URL:http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, http://www.secniche.org/papers/VB_2011_BRW_EXP_PACKS_AKS_RJE.pdf>, 9 pages.

Sood et al., "The Art of Stealing Banking Information—Form grabbing on Fire," Virus Bulletin, Nov. 2011, virusbtn.com/virusbulletin/archive/2011/11/vb201111-formgrabbing,>,(pp. 19-23 of 24 pages).

Team Cymru, "Cybercrime—an Epidemic," Queue, 4(9):24-35, Nov. 2006, http://trygstad.rice.iit.edu:8000/Articles/Cybercrime%20-%20An%20Epidem ic%2O-%2OACM%2OQueue.pdf>, 3 pages.

Trusteer, "Trusteer Rapport, Endpoint-centric Fraud Prevention", from the web http://www.trusteer.com/products/trusteer-rapport, last accessed on Jan. 9, 2013, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

Wikipedia [online]. "MD5," Jun. 30, 2014, [Retrieved on Jul. 1, 2014], Retrieved from Internet: <URL:http://en.wikipedia.org/wiki/MD5>. 12 pages.

International Search Report issued in application No. PCT/US2014/024232, dated Aug. 1, 2014, 14 pages.

International Search Report issued in application No. PCT/2014/023897, dated Jul. 18, 2014, 9 pages.

International Search Report issued in application No. PCT/2014/027805, dated Aug. 14, 2014, 10 pages.

International Search Report issued in application No. PCT/2014/027805, dated Aug. 18, 2014, 14 pages.

International Search Report issued in application No. PCT/2016/018081, dated Apr. 22, 2016, 13 pages.

International Search Report issued in application No. PCT/US15/32060, dated Aug. 25, 2015, 10 pages.

International Search Report issued in application No. PCT/US15/52030, dated Dec. 22, 2015, 17 pages.

* cited by examiner

MANAGEMENT OF DYNAMIC CREDENTIALS

PRIORITY CLAIM

This application claims the benefit under 35 U.S.C. §120 as a Continuation of application Ser. No. 14/738,913, filed Jun. 14, 2015; which is a Continuation of Ser. No. 14/290, 835, filed May 29, 2014, now U.S. Pat. No. 9,083,739 issued Jul. 14, 2015, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to techniques for improving the security of client computers interacting with server computers through an intermediary computer using morphing credentials. SUGGESTED GROUP ART UNIT: 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected a link, a browser may send a request based on the selected link to the web server. The request may be a request for data and/or include data to be processed by the web server.

A malicious user may use software, often referred to as a "bot", which imitates a browser by receiving instructions from a web server and generating requests based on those instructions. For example, a bot may receive a web page, and generate a request based on a link defined in the web page, as if the link was selected by a user. Also for example, a bot generate and send a request with data assigned to one or more parameters to simulate a user submitting data to a web server through a browser.

Malicious users may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a malicious user may cause a bot to traverse through pages of a web site and collect private and/or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 1:
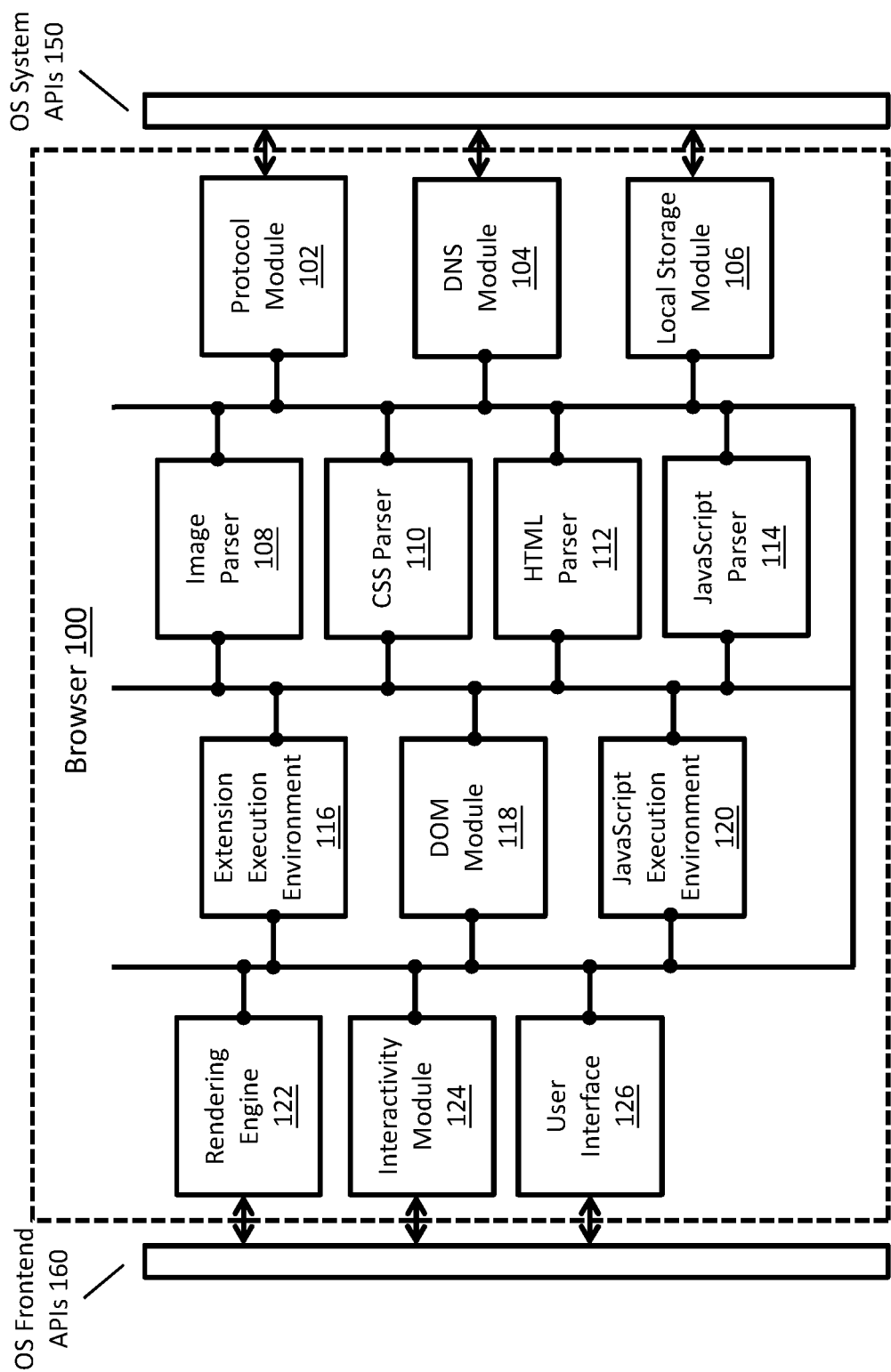
FIG. 1 illustrates functional units of a web browser.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and discussed in detail below, but using the particular arrangement illustrated in FIG. 3 is not required in other embodiments. Furthermore, while the instructions discussed in many example embodiments are HTML, JavaScript, and CSS instructions, in other embodiments, the instructions intercepted and generated may be any other standard and/or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details.

In other instances, well-known structures and devices are shown in block diagram form in order to avoid unnecessarily obscuring the present invention.

Embodiments are described herein according to the following outline:

1.0 General Overview
  2.0 Differences Between Browsers and Bots
    2.1 Example Browser Anatomy
    2.2 Example Bot Anatomy
  3.0 Network Topology
    3.1 Web Infrastructure
    3.2 Intermediary Computer
      3.2.1 Protocol Client Module
      3.2.2 Processing Engine 3.2.3 Forward Transformer
  3.2.4 Protocol Server Module
  3.2.5 Credential Validation Module
  3.2.6 Reverse Transformer
  3.2.7 Configurations
  3.2.8 Storage
 3.3 Browser
4.0 Process Overview
 4.1 Intercepting Instructions from a Content Server Computer
 4.2 Modifying Instructions which Causes a Browser to Submit a Credential with One or More Requests
 4.3 Rendering a Second Set of Instructions Comprising Credential-Morphing-instructions
 4.4 Sending the Modified and Credential-Morphing-instructions to the Client Computer
 4.5 Updating the Credential Over Time
 4.6 Validating a Credential
  4.6.1 Implied Parameters
  4.6.2 Express Parameters
 4.7 Generating a New Credential
  4.7.1 Generating a First Credential
 4.8 Sending a New Credential
  4.8.1 Sending a Seed Value from which the New Credential may be Generated
 4.9 Updating a Credential Over Time
 4.10 Validating a Request for Data
 4.11 Performing a Negative Responsive Action
 4.12 Forwarding the Request to a Server Computer
5.0 Implementation Mechanisms—Hardware Overview
6.0 Other Aspects of Disclosure
1.0 General Overview In an embodiment, a data processing method comprises intercepting, from a first computer, a first set of instructions that define one or more original operations, which are configured to cause one or more requests to be sent if executed by a client computer; modifying the first set of instructions to produce a modified set of instructions, which are configured to cause a credential to be included in the one or more requests sent if executed by the client computer; rendering a second set of instructions comprising the modified set of instructions and one or more credential-morphing-instructions, wherein the one or more credential-morphing-instructions define one or more credential-morphing operations, which are configured to cause the client computer to update the credential over time if executed; sending the second set of instructions to a second computer.

In an embodiment, the method comprises receiving a request for data; performing a negative responsive action in response to determining the request does not include a valid credential. In an embodiment, the method comprises receiving a request for data at a particular time, wherein the request includes the credential and the credential corresponds with one or more parameters; performing a negative responsive action in response to determining that the one or more parameters are not satisfied based, at least in part, on the particular time.

In an embodiment, the method comprises associating the credential with one or more parameters; receiving a first request for a new credential and comprising the credential; determining that the one or more parameters associated with the credential are satisfied, and in response: generating the new credential; associating the new credential with one or more new parameters; sending the new credential to the second computer; receiving a second request, which includes the new credential, for data on the first computer; forwarding at least a portion of the second request to the first computer in response to determining the one or more new parameters associated with the new credential are satisfied.

In an embodiment, the method comprises generating the credential, which comprises one or more encrypted parameters; receiving a first request for a new credential and comprising the credential; decrypting the one or more encrypted parameters to produce one or more decrypted parameters; determining that the one or more decrypted parameters are satisfied, and in response: generating the new credential, which comprises one or more new encrypted parameters; sending the new credential to the second computer; receiving a second request, which includes the new credential, for data from the first computer; decrypting the one or more encrypted parameters to produce one or more new decrypted parameters; forwarding at least a portion of the second request to the first computer in response to determining that the one or more new decrypted parameters are satisfied.

2.0 Differences Between Browsers and Bots

A web browser may be a tool through which application programs can provide client computers with content in a dynamic, custom UI. For example, in response to receiving a request for data from a web browser, a web server responds with a set of instructions and/or data. The instructions may define one or more objects that include data and/or other objects. The instructions may also define how the data and/or objects may be presented in a UI to enable human/computer interaction.

In contrast, bots traverse web pages and/or web sites to retrieve data from, and/or submit data to, one or more web servers with little, if any, human/computer interaction. For example, in response to receiving a request for data from a bot, a web server responds with a set of instructions. As discussed above, the instructions may define one or more objects that include data and/or other objects. The instructions may also define how the data and/or objects may be presented in a UI. However, a bot may parse the instructions looking for particular data to store and/or use to make subsequent requests. A bot need not execute the instructions because the bot is built to operate with little, if any, human/computer interaction. The bot may simply look for data by parsing the one or more data structures defined in the instructions. Thus, a bot may be a functionally-limited browser.

A server computer that requires a browser to use one or more parsers and/or execution environments may filter out requests from bots. For purposes of illustrating a clear example, assume a browser includes a JavaScript parser or JavaScript execution engine, and a bot does not include a JavaScript parser or JavaScript execution engine. Also assume that a server computer may include one or more JavaScript instructions in a web page, which if executed, may cause a browser to request, receive, generate, and/or update a dynamic credential. A dynamic credential may be a credential that is updated over time. Accordingly, the browser may parse and execute the one or more JavaScript instructions, which cause the browser to request, receive, generate, and/or update the credential over time and include a valid dynamic credential in a subsequent request.

In contrast, a bot, which does not include a JavaScript parser and/or JavaScript execution environment, may not request, receive, generate, and/or update the dynamic credential over time. Thus, the bot may not include a valid dynamic credential in a subsequent request.

If a server computer receives a request for a web page with a valid dynamic credential from a browser, then the server computer may send the requested web page to the browser. However, if the server computer receives a request without a valid dynamic credential from the bot, then the server computer may perform a negative action, such as terminating the request or ignoring one or more future requests from the bot.

2.1 Example Browser Anatomy

FIG. 1 illustrates functional units of a web browser. Browser 100 may be a browser that is executed on a personal computer, used to communicate with or otherwise conceptually visit a web server, and operated by a user using the personal computer. Browser 100 is communicatively coupled with operating system ("OS") system application programming interface ("API") layer 150 and OS frontend API layer 160. Other embodiments may use other protocols, modules, and/or parsers.

Browser 100 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 120. Protocol module 102, DNS module 104, and local storage module 106 may send and/or receive data through OS System API layer 150. For example, protocol module 102 may send and/or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser 100 may comprise sets of program logic implementing one or more programmable engines, such as extension execution environment 116 and JavaScript execution environment 120. Extensions may be written one or more programming languages include JavaScript, Python, Ruby, and/or any other language. Each programmable engine may have access to DOM module 118 and may operate on one or more objects from a DOM maintained by DOM module 118. For example, JavaScript execution environment 120 may execute JavaScript parsed by JavaScript parser 114 and in response, create, update, and/or delete one or more objects managed by DOM module 118, and/or one or more aspects of a UI presenting the one or more objects.

Browser 100 comprises rendering engine 122, interactivity module 124, and user interface 126. Each of the components may cause, through OS frontend API layer 160, one or more objects to be presented to a user using a client computer. Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to a client computer through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly.

2.2 Example Bot Anatomy

A bot may include a subset of the modules and/or features included in browser 100. For example, a bot may include protocol module 102, DNS module 104, local storage module 106, and HTML parser 112. A bot need not support a UI; thus, a bot need not include rendering engine 122, interactivity module 124, and user interface 126.

To increase processing time and speed of development, a bot need not include one or more parsers and/or execution environments. For example, a bot may be configured to look for data embedded in a DOM defined in one or more HTML documents. Therefore, a bot may include an HTML parser. However, a bot need not include one or more parsers or execution environments, such as image parser 108, CSS parser 110, JavaScript parser 114, extension execution environment 116, and/or JavaScript execution environment 120.

3.0 Network Topology

Figure 2:
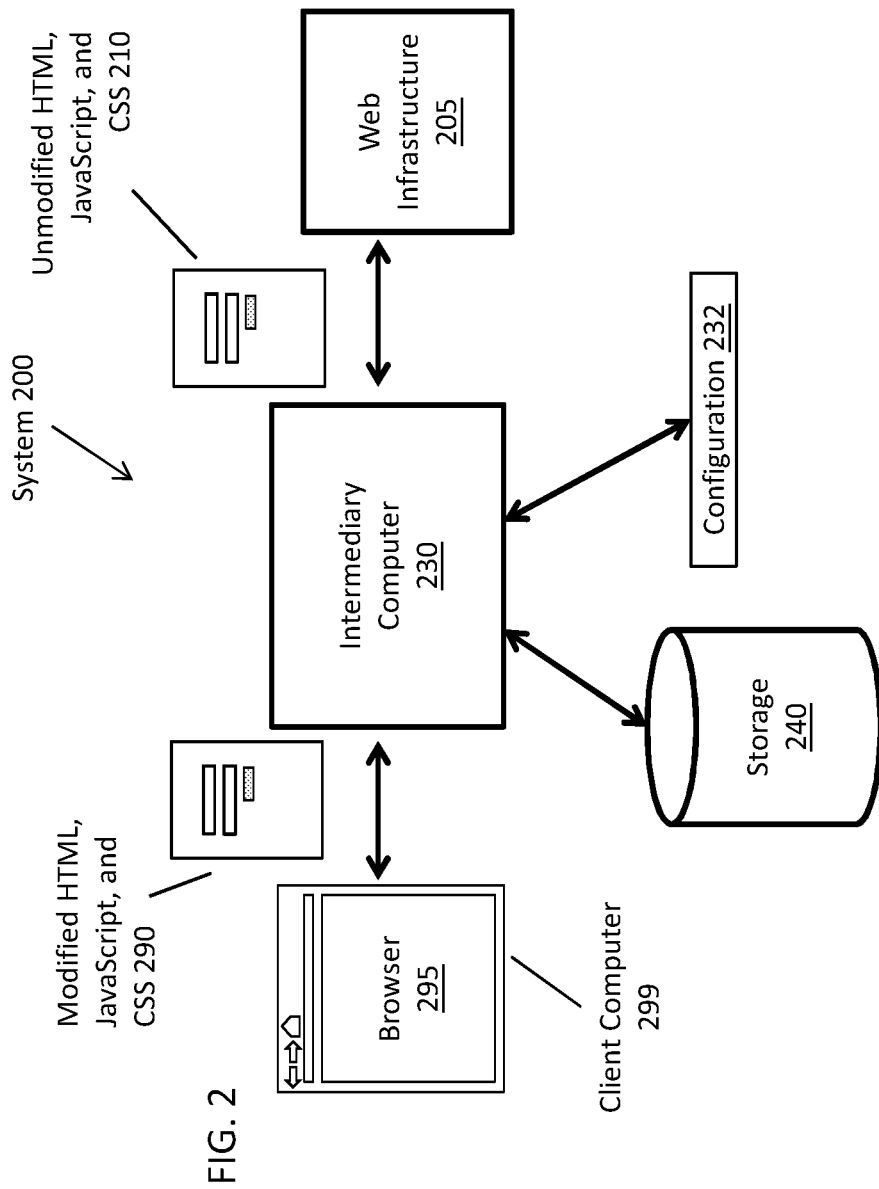
FIG. 2 illustrates a computer system comprising a browser, an intermediary computer, and a web infrastructure in an example embodiment.
Figure 3:
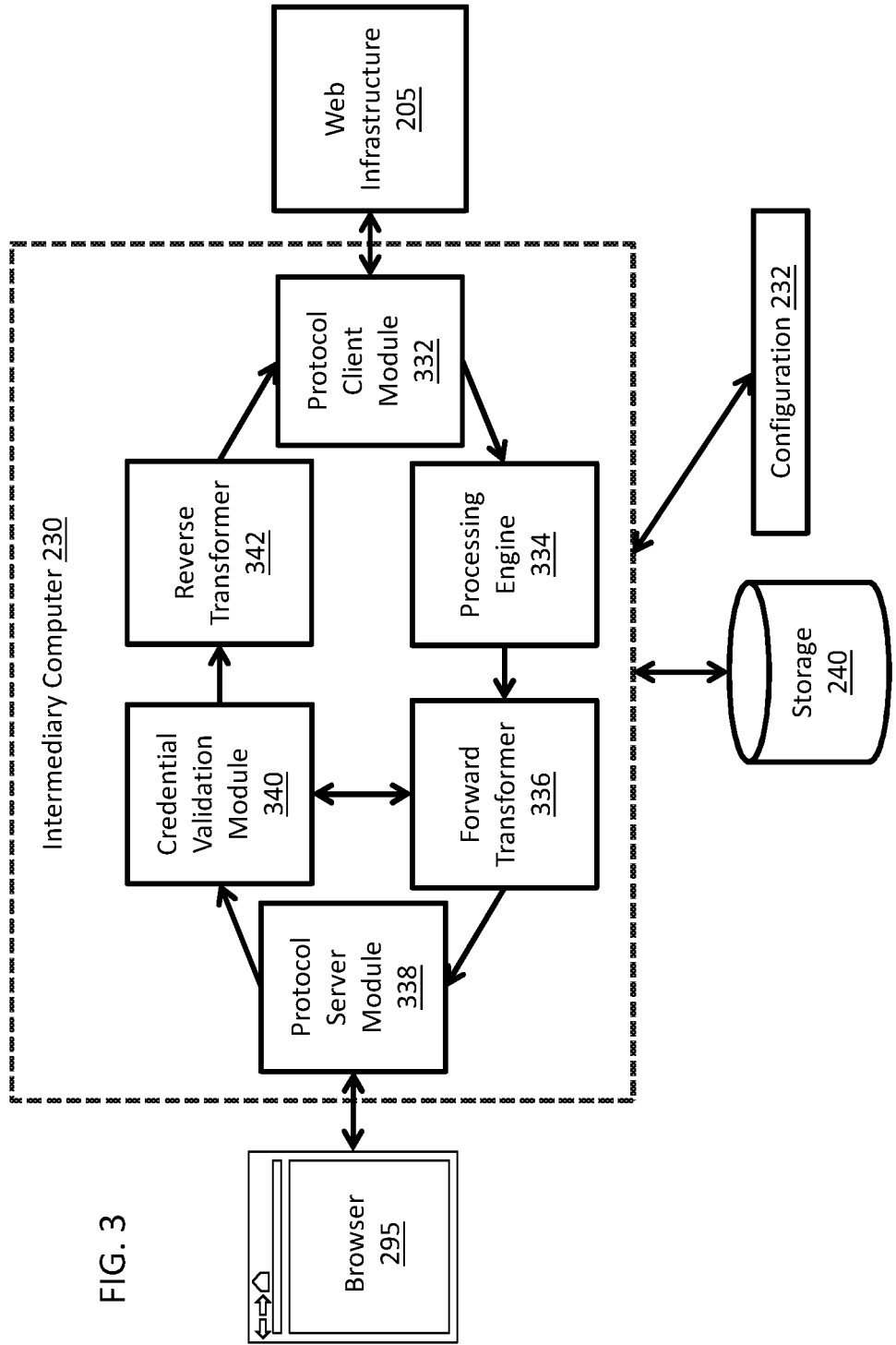
FIG. 3 illustrates detailed view of an intermediary computer in an example embodiment.

FIG. 2 illustrates a computer system comprising a browser, an intermediary computer, and a web infrastructure in an example embodiment. Referring first to FIG. 2, system 200 includes web infrastructure 205, client computer 299, intermediary computer 230, storage 240, and configuration 232 distributed across a plurality of interconnected networks.

While each of the components listed above is illustrated as if running on a separate, remote computer from each other, one or more of the components listed above may be part of and/or executed on the same computer. For example, intermediary computer 230, configuration 232, storage 240, and/or web infrastructure 205 may be executed on the same computer, local area, and/or wide area network. Additionally or alternatively, intermediary computer 230 may be a proxy server and/or layer for web infrastructure 205. Additionally or alternatively, intermediary computer 230 may be in line between a router and web infrastructure 205, such that intermediary computer 230 may intercept all network data sent to, and/or sent from, web infrastructure 205 over one or more protocols. Additionally or alternatively, intermediary computer 230, and/or one or more modules comprising intermediary computer 230 discussed herein, may be a software layer between, and/or executed on, web infrastructure 205 and/or a component of web infrastructure 205. Additionally or alternatively, intermediary computer 230, and/or one or more modules comprising intermediary computer 230 discussed herein, may be part of a server-side application that responds to requests over one or more standard and/or proprietary protocols, such as HTTP and/or any other protocol.

3.1 Web Infrastructure

Web infrastructure 205 may comprise one or more server computers that receive requests for data from users through one or more computers, such as client computer 299 and/or intermediary computer 230. Web infrastructure 205 may respond by sending data to the browser that sent the request. As illustrated in FIG. 2, the data sent from web infrastructure 205 may include instructions: HTML, JavaScript, and CSS 210. The one or more computers in web infrastructure 205 may, but need not, be owned and/or managed by one or more independent entities and may span across one or more computer networks.

A server computer may be a computer that receives requests for data and responds with data. For example, a web server computer may be an HTTP-based computer that receives HTTP requests and responds with data comprising HTML, CSS, and/or JavaScript instructions. Additionally or alternatively, a server computer may respond with data that references data on other server computers in, and/or outside of, web infrastructure 205.

3.2 Intermediary Computer

Intermediary computer 230 may be an intermediary that may intercept instructions sent from web infrastructure 205, parse and/or execute one or more of the intercepted instructions, modify the intercepted instructions, generate and/or add new instructions, and send the modified and/or new instructions to a client computer. For example, intermediary computer 230 may intercept HTML, JavaScript, and CSS 210, generate modified HTML, JavaScript, and CSS 290, and send modified HTML, JavaScript, and CSS 290 to browser 295. Intermediary computer 230 may intercept a request from browser 295, generate a new and/or modified request, and send the new and/or modified request to web infrastructure 205.

Intermediary computer 230 may be an HTTP or SPDY intermediary that intercepts, parses, executes, and/or processes HTML, JavaScript, and CSS instructions. Additionally or alternatively, intermediary computer 230 may intercept requests for data and/or instructions from a client application, generate a new HTTP request, and send the newly generated HTTP request to one or more HTTP and/or SPDY-based web servers. Additionally or alternatively, intermediary computer 230 may be an intermediary for any other standard and/or proprietary protocol. Furthermore, each of the components discussed herein, which intermediary computer 230 is comprised of, may be configured to perform any of the processes and/or methods discussed herein for any standard and/or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 and/or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205, such as original web server computer 302.

In FIG. 2, intermediary computer 230 is programmed to send instructions to, and receive requests from, a particular type of client application: browser 295. However, in an embodiment, intermediary computer 230 may be programmed to send instructions to, receive requests from, and/or open sockets with browsers and/or bots.

FIG. 3 illustrates detailed view of an intermediary computer in an example embodiment. In FIG. 3, intermediary computer 230 comprises protocol client module 332, processing engine 334, forward transformer 336, protocol server module 338, credential validation module 340, and reverse transformer 342. In an embodiment, each of the functional units of intermediary computer 230 may be implemented using any of the techniques further described herein in connection with FIG. 7; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

3.2.1 Protocol Client Module

Protocol client module 332 may intercept data over any standard or proprietary protocol. For example, protocol client module 332 may intercept data over HTTP.

3.2.2 Processing Engine

Processing engine 334 may process instructions intercepted by protocol client module 332, which causes processing engine 334 to generate one or more data structures. Processing one or more instructions may comprise parsing and/or executing the one or more instructions. After processing the instructions, processing engine 334 may notify forward transformer 336 to begin rendering instructions based on the one or more data structures created by processing engine 334 that are currently in memory.

Processing engine 334 may make requests for additional data. For example, if instructions received from protocol client module 332 reference additional instructions stored on another web server, then processing engine 334 may request the additional instructions through protocol client module 332.

3.2.3 Forward Transformer

Forward transformer 336 may render a new set of instructions based on the one or more data structures in memory. Additionally or alternatively, forward transformer 336 may operate on the objects created by processing engine 334 and generate one or more credential-morphing-instructions, which if executed are configured to cause a browser to request, receive, generate, and/or update one or more dynamic credentials. Forward transformer 336 may store the one or more dynamic credentials and/or data associated with one or more dynamic credentials in storage 240. Forward transformer 336 may operate on objects and/or render instructions based on one or more configurations specified in configuration 232. Forward transformer 336 may send the rendered instructions to one or more client computers through protocol server module 338.

3.2.4 Protocol Server Module

Protocol server module 338 may receive the instructions generated by forward transformer 336 and send the generated instructions to client computer 299. Additionally or alternatively, protocol server module 338 may intercept requests from client computer 299 and forward the requests to credential validation module 340.

3.2.5 Credential Validation Module

Credential validation module 340 may receive requests intercepted by protocol server module 338 from browser 295. Credential validation module 340 may validate requests and/or credentials, and forward the requests for one or more pages to reverse transformer 342.

Credential validation module 340 may generate one or more dynamic credentials. For example, forward transformer 336 may render a page and embed a dynamic credential received from credential validation module 340 into the page. Also for example, in response to a request from a client computer for a dynamic credential, credential validation module 340 may generate a new, valid dynamic credential and send the new dynamic credential to the client computer through protocol server module 338.

Credential validation module 340 may generate one or more parameters associated with dynamic credential. For example, credential validation module 340 may store a credential, a timestamp, and an Internet Protocol ("IP") address in storage 240. As discussed in detail herein, credential validation module 340 may validate a request with the stored credential based on the timestamp and the IP address associated with the stored credential.

Credential validation module 340 may authorize requests based on configuration 232. For purposes of illustrating a clear example, assume that configuration 232 includes data indicating that a particular web page is public. In response to a request for the particular web page, which does not include a dynamic credential, credential validation module 340 may authorize the request based on configuration 232.

3.2.6 Reverse Transformer

Reverse transformer 342 may translate requests intercepted by protocol server module 338, which are based on instructions generated by forward transformer 336, into requests that would have been generated by browser 295 had browser 295 received the original instructions sent from web infrastructure 205. For example, if a request from browser 295 includes a dynamic credential generated by credential validation module 340, then reverse transformer 342 may generate a new request that does not include the dynamic credential. Reverse transformer 342 may send the new request web infrastructure 205 through protocol client module 332 on behalf of browser 295.

3.2.7 Configurations

Configuration 242 may be a database, a configuration file, and/or any other system that stores configurations: settings, preferences, and/or protocols. Configuration 242 may store more than one configuration for one or more web servers in web infrastructure 205. For example, configuration 232 may include data that indicates requests to a particular server computer in web infrastructure 205 need not be validated. Additionally or alternatively, configuration 232 may include data that indicates requests for a particular web page need not be validated. Additionally or alternatively, configuration 232 may include data that indicates requests to submit data to a particular web site need not be validated. Also for example, configuration 232 may include data that indicates whether particular web pages should be processed by processing engine 334 and/or modified by forward transformer 336.

Configuration 232 may be modified by a user and/or administrator through one or more computers, such as intermediary computer 230, a computer in web infrastructure 205, and/or any other computer. The one or more computers may present the user with an interface that presents the user with a site map. The site map may comprise a graph, wherein the nodes correspond to pages and the edges between the nodes correspond to links.

The user may update configuration 232, through the interface, by selecting which links and/or pages to be "public" (do not require a valid credential) and which links and/or pages are "private" (require a valid credential). For example, the interface may receive input from a user indicating that a page is public. Configuration 232 may be updated accordingly. When a request is received for the particular page, even if the request does not have a valid credential, intermediary computer 230 may pass the request to web infrastructure 205. Also for example, the interface may receive input from a user indicating that a link, with a particular link identifier, is public. When intermediary computer 230 receives a request that includes a particular link identifier, then intermediary computer 230 may pass the request to web infrastructure 205 even if the request does not have a valid credential.

3.2.8 Storage

Storage 240 may be a database, a configuration file, and/or any other system and/or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may, at least in part, be a data structure stored in shared memory between one or more intermediary computers. Additionally or alternatively, intermediary computer 230 may, at least in part, be stored in volatile and/or non-volatile memory.

3.3 Browser

Browser 295 may be a browser as described herein and executed on a client computer, such as client computer 299. Additionally or alternatively, browser 295 may be a bot comprising one or more of the components traditionally found in a browser.

4.0 Process Overview

In an embodiment, a data processing method may be configured to intercept instructions from a server computer that are directed toward a browser, modify the intercepted instructions, include one or more credential-morphing-instructions, render a second set of instructions comprising the modified set of instructions and one or more credential-morphing-instructions. In an embodiment, a data processing method may be configured to receive requests from a browser for a new credential from a client application, validate the request using a previous credential, generate the new credential, and send the new credential to the browser. In an embodiment, a data processing method may be configured to receive requests from a client computer for data on a server computer, validate the request based on a dynamic credential. In an embodiment, if the request is valid, then the processing method may be configured to modify the request, send the modified request to a server computer, receive data from the server computer in response to the modified request, and/or send a response to a client computer. Various embodiments may use standard web protocols, such as HTTP, and/or standard web-based instructions, such as HTML, CSS, and/or JavaScript. Additionally or alternatively, other standard and/or proprietary protocols may be used. Additionally or alternatively, other standard and/or proprietary instructions may be used.

4.1 Intercepting Instructions From a Content Server Computer

Figure 4:
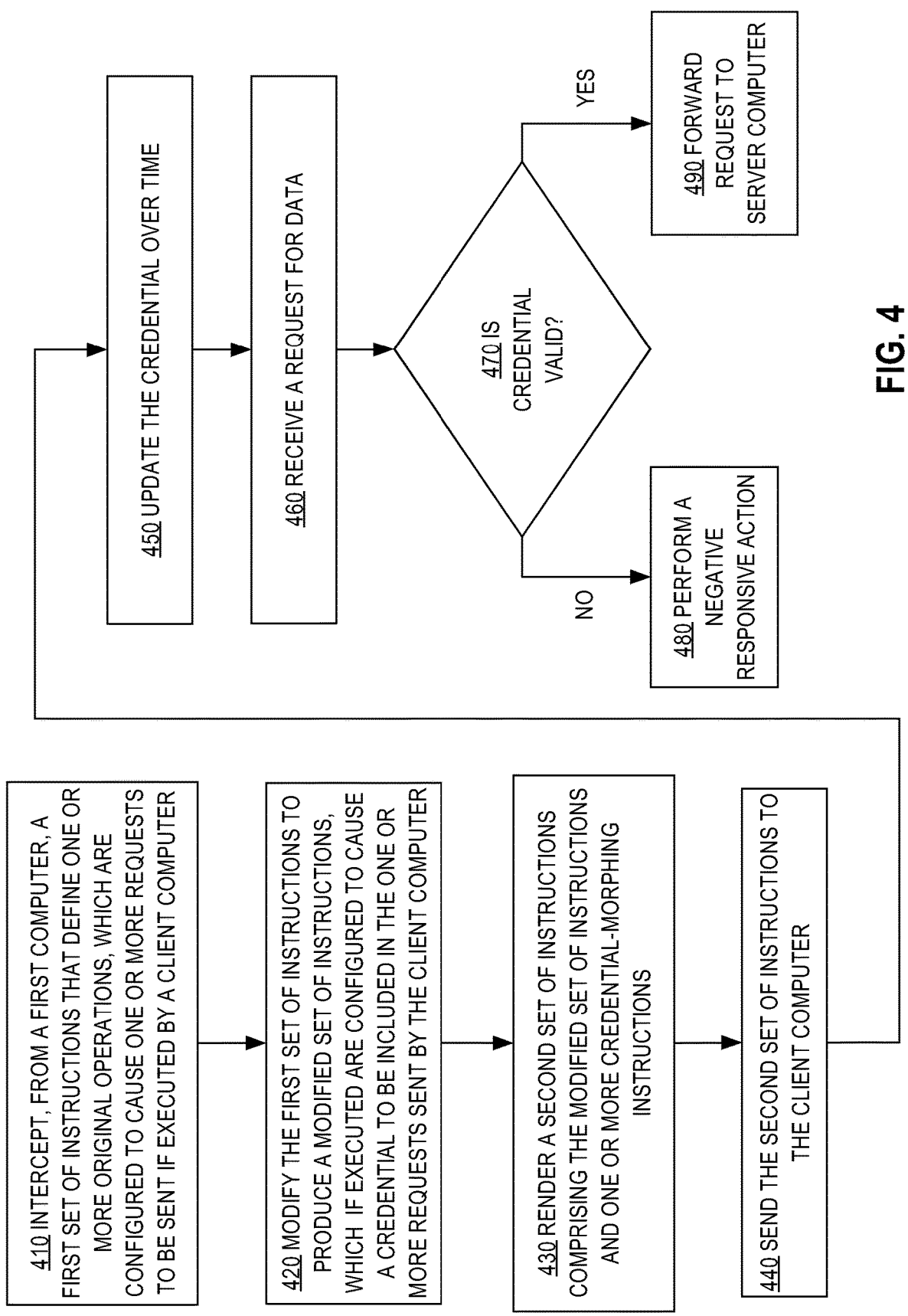
FIG. 4 illustrates a process for validating requests from browsers, and filtering out requests from bots, using one or more dynamic credentials in an example embodiment.

FIG. 4 illustrates a process for validating requests from browsers, and filtering out requests from bots, using one or more dynamic credentials in an example embodiment. In step 610, an intermediary computer intercepts, from a first computer, a first set of instructions that define one or more original operations, which are configured to cause one or more requests to be sent if executed by a client computer. For example, protocol client module 332 may receive instructions from web infrastructure 205. The instructions may comprise HTML, CSS, and/or JavaScript. The HTML, may define one or more links, forms, and/or Uniform Resource Locators ("URLs") that a request may be sent to send and/or receive data.

4.2 Modifying Instructions Which Cause a Browser to Submit a Credential with One or More Requests In step 420, the intermediary computer modifies the first set of instructions to produce a modified set of instructions, which if executed are configured to cause a credential to be included in the one or more requests sent by the client computer. For purposes of illustrating a clear example, assume that the instructions received in the previous step comprise HTML, CSS, and JavaScript instructions that define a link, which a browser or bot may use to generate a request for additional data and/or instructions. Processing engine 334 may parse the instructions. Forward transformer 336 may identify the link processed by processing engine 334. Forward transformer 336 may modify the instructions that define the link, such that if the link is selected by a user using a browser, then the browser executes a JavaScript callback that causes the browser to modify the URL, one or more parameters in the URL, and/or data submitted in a request based on the URL, to include a dynamic credential. Accordingly, when the browser generates the request based, at least in part on the URL, the request includes a dynamic credential. The foregoing is an example of a technique for modifying instructions to cause a browser to include a credential in a URL. Other embodiments may use one or more other techniques.

For purposes of illustrating another clear example, assume that the instructions received in the previous step define a form that is associated with a submit method. The submit method may be configured to collect data from one or more of the fields in the form and send the collected data in a request, such as an HTTP POST request, to a server computer. After processing engine 334 parses the instructions, forward transformer 336 may add a new field in the form that includes a dynamic credential. Accordingly, when the submit method is executed, the browser may generate a request that includes the credential stored in the added field with other data from other fields in the form. Additionally or alternatively, forward transformer may generate a wrapper for the previously defined submit method. The wrapper may be configured to call the previously defined submit method and tack on a credential in the payload of the request.

Additionally or alternatively, intermediary computer 230 may determine whether to parse and/or modify instructions based on configuration 232. For example, if protocol client module 332 receives a set of original instructions in response to a request for a particular web page, and configuration 232 includes data that indicates the particular web page is a public page and/or should not be modified, then processing engine 334 and/or forward transformer 336 may send the original instructions to the intended client computer without processing or modifying the instructions. Also for example, if processing engine 334 and/or forward transformer 336 determine that a set of instructions define a particular link to a particular target page and/or URL, and if configuration 232 includes data that indicates the particular link and/or the particular target page and/or URL are protected, then forward transformer 336 may modify the instructions that define the particular link. Similarly, if processing engine 334 and/or forward transformer 336 determine that a set of instructions define a particular link to a particular target page and/or URL, and if configuration 232 includes data that indicates the particular link and/or the particular target page and/or URL are public, then forward transformer 336 may modify the instructions that define the particular link.

In the above examples, the modified instructions may be executed by a browser using one or more particular parsers and/or execution environments, such as JavaScript parser 114, extension execution environment 116, and/or JavaScript execution environment 120. Thus, a bot without the particular parser(s) and/or execution environment(s) needed to parse and execute the modified instructions may not generate a request that includes a dynamic credential. Accordingly, a request for instructions and/or data from a bot may be dismissed, ignored, and/or other responded to in a negative manner.

The modified instructions need not include a valid credential. The modified instructions may merely cause a credential to be included in one or more requests sent by the client computer. How a valid dynamic credential is requested, received, and/or generated is discussed in detail herein.

4.3 Rendering a Second Set of Instructions Comprising Credential-Morphing-Instructions In step 430, the intermediary computer renders a second set of instructions comprising the modified set of instructions and one or more credential-morphing-instructions. The one or more credential-morphing-instructions may define one or more operations causing a browser with a particular parser and/or execution environment to request, receive, generate, and/or update a valid credential that changes over time. For example, forward transformer 336 may render a second set of instructions that include the modified instructions and credential morphing-instructions comprising one or more JavaScript instructions, which if parsed and/or executed are configured to cause a browser to request, receive, generate, and/or update a valid credential that changes over time. Additionally or alternatively, forward transformer 336 may include the credential-morphing-instructions by including a reference to a file with credential-morphing-instructions, such as an additional JavaScript file, in the rendered instructions.

If a bot does not have the particular parser and/or execution environment necessary to execute the credential-morphing-instructions, then the bot may not have a valid dynamic credential to submit with a subsequent request. Accordingly, subsequent requests from bots may be dismissed, ignored, and/or otherwise negatively dealt with as discussed herein. However, requests from browsers may be processed as if uninterrupted by an intermediary.

4.4 Sending the Modified and Credential-Morphing-Instructions to the Client Computer In step 440, the intermediary computer sends the second set of instructions, which comprise the modified instructions and the credential morphing-instructions to the client computer. For example, forward transformer 336 may send the modified instructions in step 420 and the credential-morphing-instructions in step 430 to browser 295.

4.5 Updating the Credential Over Time

In step 450, the client computer parses and/or executes the credential-morphing-instructions and updates the credential over time. The credential-morphing-instructions may cause the client computer, and/or browser executing on the client computer, to perform one or more methods to update a credential over time. In an embodiment, the credential may be stored in storage on a client computer, intermediary computer, and/or storage. The storage may, but need not be, non-volatile storage. When a new credential is received and/or generated, the old credential is deleted. Each newly received and/or generated credential may replace a previous credential at the particular address in memory that the previous credential was stored.

Figure 5:
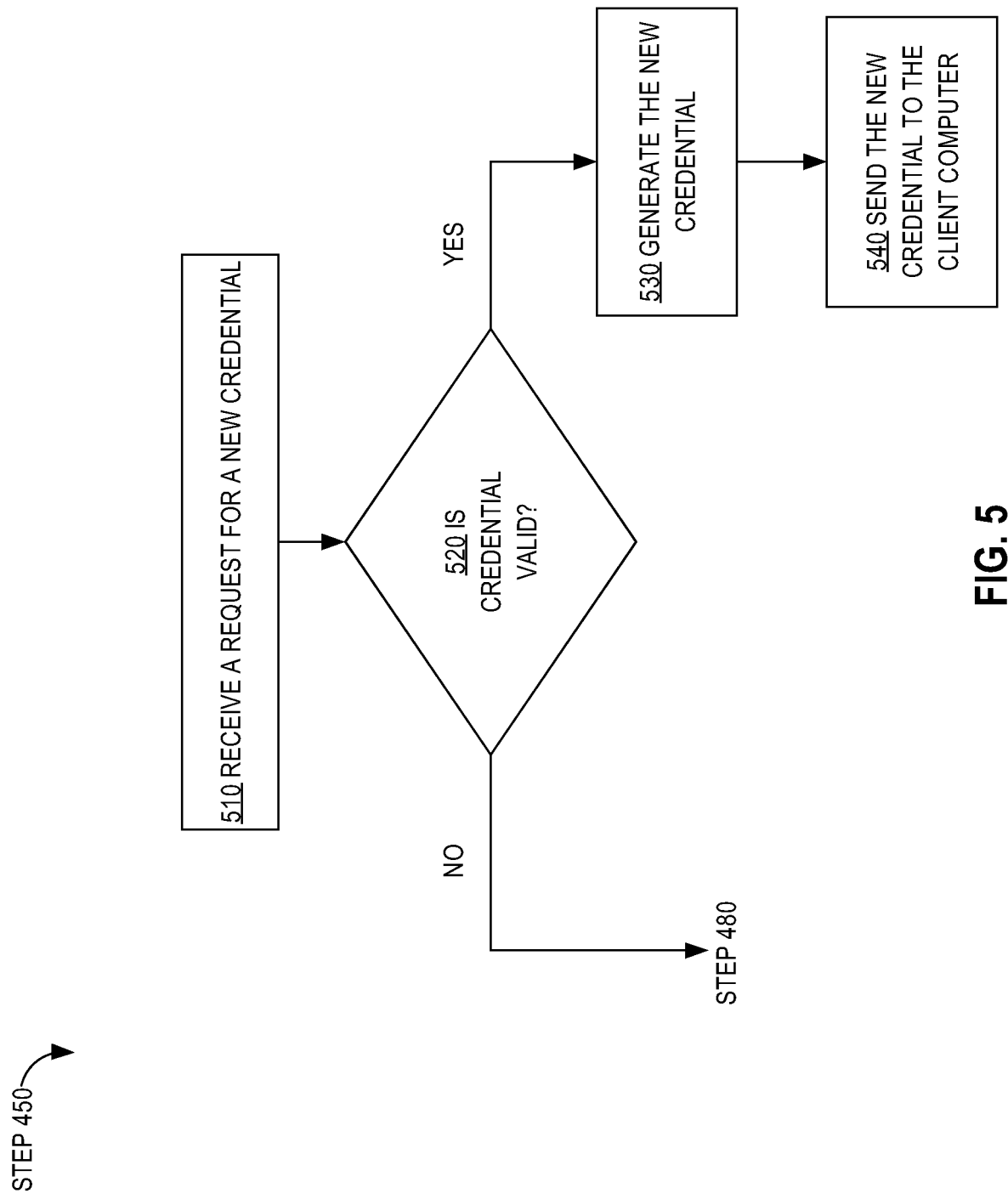
FIG. 5 illustrates a process for updating a credential over time in an example embodiment.

FIG. 5 illustrates a process for updating a credential over time in an example embodiment. In step 510, the intermediary computer receives a request for a new credential. For purposes of illustrating a clear example, assume that browser 295 receives the second set of instructions sent in step 440, and that the credential-morphing-instructions, if executed, are configured to cause browser 295 to request a new credential from intermediary computer 230. Accordingly, browser 295 may parse and/or execute the credential-morphing-instructions using JavaScript parser 114 and JavaScript execution environment 120 to send a request for a new credential to intermediary computer 230. If browser 295 has already received and/or generated a credential, then browser 295 may send one or more of the previously received and/or generated credential in the request. Protocol server module 338 may receive the request and forward the request to credential validation module 340.

4.6 Validating a Credential

In step 520, the intermediary computer determines whether the credential is valid. For example, credential validation module 340 may determine that the old credential is valid if it is stored in storage 240 and/or other storage device. Additionally or alternatively, credential validation module 340 may determine that a credential is valid based on one or more implied and/or express parameters. If credential validation module 340 determines that each of the parameters is satisfied, then control may pass to step 530. Otherwise, control may pass to step 480.

Credential validation module 340 may delete a credential and/or one or more parameters associated with the credential after credential validation module 340 validates the credential. Thus, credential validation module 340 need not validate the same credential more than once.

Bots may request additional web pages quickly compared to a user viewing a page and selecting a link. To thwart and slow down one or more requests from bots, a credential may have a parameter that indicates the credential is invalid for a first amount of time before it becomes valid for a second period of time. Thus, if a bot is able to determine a valid credential and quickly sends a request with the credential to the intermediary computer, the intermediary computer may determine that the credential is invalid and pass to step 480.

A credential may be associated and/or embedded with one or more implied and/or express parameters. For example, a credential may be, and/or be associated with, a timestamp, a time range, an IP address, a subnet, a browser identifier, a username, a password, a keyword, a randomly generated value, and/or any other identifier and/or key that may be used to determine whether a credential is valid.

4.6.1 Implied Parameters

An implied parameter may be a parameter that is inherent to the credential. For example, a credential may be based on time, and credential validation module 340 may determine the time from the credential. Credential validation module 340 may be configured to determine that a credential is valid if the determined time is within a particular amount of time from the current time. Similarly, credential validation module 340 may be configured to determine that a credential is invalid if the determined timestamp identifies a time that is outside a particular amount of time from the current time.

4.6.2 Express Parameters

An express parameter may be a parameter that is associated with, and/or embedded in, a credential. For example, a credential may be associated with a parameter stored in storage 240, which indicates the time at which the credential is no longer valid. Credential validation module 340 may query for the parameter stored in storage 240 based on the credential. If the current time is less than the time retrieved from storage 240, then credential validation module 340 may determine that the old credential is valid. Otherwise, credential validation module 340 may determine that the credential is invalid.

Additionally or alternatively, a credential may include one or more encrypted parameters. Instead of storing one or more parameters in storage 240, credential validation module 340 may generate a credential that comprises one or more encrypted parameters. Credential validation module 340 may validate the credential by decrypting the one or more encrypted parameters and determining whether each of the decrypted parameters is satisfied. If so, then credential validation module 340 may determine the credential is valid. Otherwise, credential validation module 340 may determine the credential is invalid.

4.7 Generating a New Credential

In step 530, the intermediary computer generates a new credential. For example, credential validation module 340 may generate a new credential with one or more implied and/or express parameters. The one or more parameters may include any of the parameters discussed above, and/or any other value, identifier, and/or key that may be used to determine whether the new credential is valid. Credential validation module 340 may store the new credential and/or the one or more parameters in storage 240. Additionally or alternatively, credential validation module 340 may embed one or more parameters in the new credential.

4.7.1 Generating a First Credential

Intermediary computer 230 may not have an old credential to validate. For example, when a browser, such as browser 295, requests a page and/or credential from intermediary computer 230 for the first time, browser 295 may not have an old credential for intermediary computer 230 to validate. If intermediary computer 230 receives a request for a new credential without an old credential to validate, then intermediary computer 230 may generate a credential as discussed in detail herein. Additionally, the credential may be an "initialization credential", which may be used by the browser, and/or the credential-morphing-instructions, to request a new valid credential If intermediary computer 230 receives a request from browser 295 for a new credential with an initialization credential and determines the initialization credential is valid, then intermediary computer 230 may respond with a valid new credential as discussed herein. However, if intermediary computer 230 receives a request from browser 295 for a web page from web infrastructure 205 with an initialization credential, then control may pass to step 480.

In an embodiment, forward transformer 336 may include a credential with the credential morphing-instructions. The credential may be an initialization credential. However, in an embodiment, forward transformer 336 need not include a credential with the credential morphing-instructions.

4.8 Sending a New Credential

In step 540, the intermediary computer may send the new credential to the client computer. For example, credential validation module 340 may send the credential to browser 295 through protocol server module 338.

In an embodiment, credential validation module 340 may send the new credential to forward transformer 336. Forward transformer 336 may generate one or more new credential-morphing-instructions which when executed operate on the credential and/or request a new credential. For example, if executed, the one or more instructions may be configured to replace the previous credential in memory on the client computer. Additionally or alternatively, if executed, the one or more instructions may be configured to indicate when the client computer and/or browser should send a new request for a new credential. Additionally or alternatively, if executed, the one or more instructions may be configured to generate a new credential.

4.8.1 Sending a Seed Value From Which the New Credential May Be Generated

Figure 6:
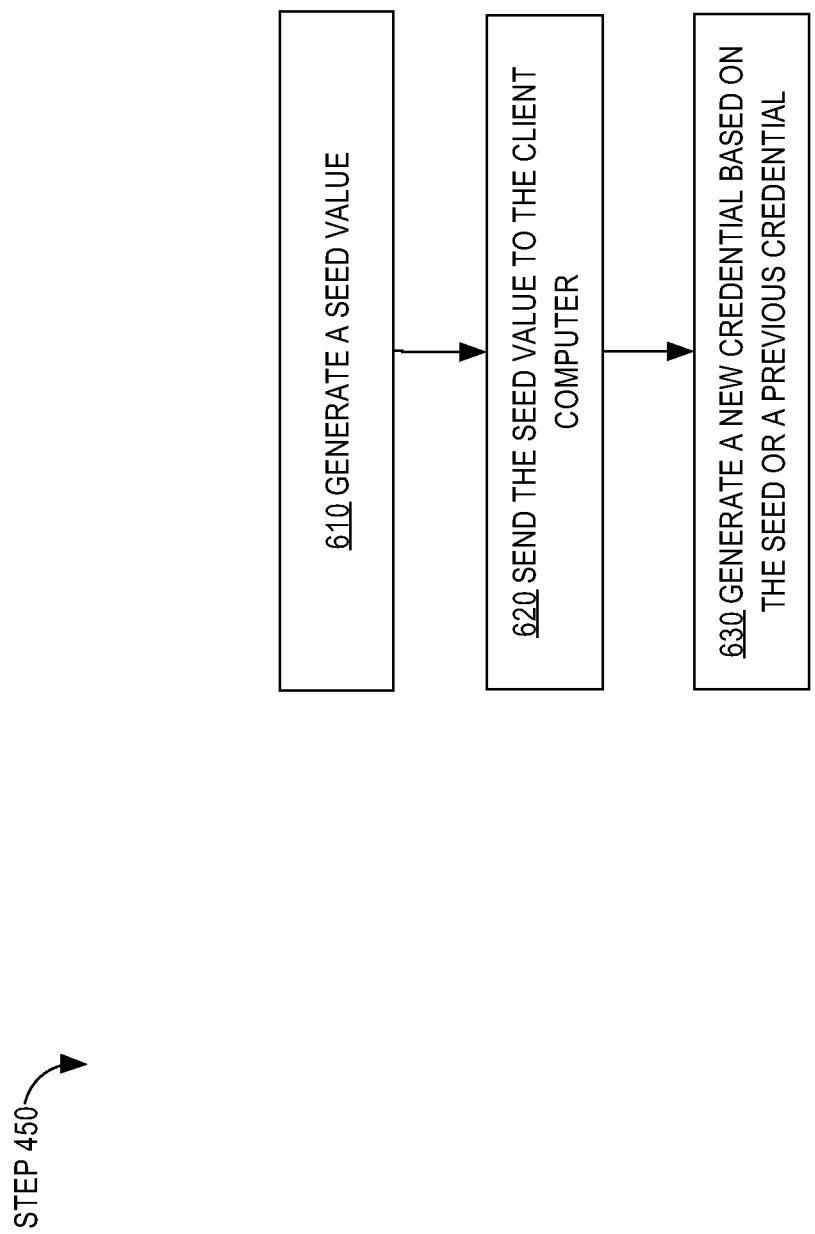
FIG. 6 illustrates a process for generating a seed value and sending the seed value to the client computer to generate one or more new credentials in an example embodiment.

Forward transformer may generate a seed value from a new credential generated by credential validation module, which may be used to generate the new credential by the client computer. FIG. 6 illustrates a process for generating a seed value and sending the seed value to the client computer to generate one or more new credentials in an example embodiment. In step 610, the intermediary computer 230 generates a seed. For purposes of illustrating a clear example, assume forward transformer 336 receives a new credential from credential validation module 340 to be sent to a browser. Forward transformer 336 may generate a seed value based on the new credential.

In step 620, the intermediary computer sends the seed value to the client computer. For example, forward transformer 336 sends the seed value to browser 295.

In step 630, the client computer generates a new credential based on the seed or a previous credential. For example, browser 295 may execute one or more credential-morphing-instructions, which may be configured to generate a valid credential based on a seed received from intermediary computer 230. In an embodiment, over time, browser 295 may execute the credential-morphing-instructions again to generate a new valid credential based on one or more previously generated valid credentials.

4.9 Updating a Credential Over Time

The intermediary computer may repeat steps 450 according to the credential-morphing-instructions. For example, the credential morphing-instructions may define a time period, after which a browser should request, receive, generate, and/or update a new credential as discussed in detail herein.

Forward transformer 336 may render and send one or more new credential morphing-instructions with each credential and/or a seed, which if executed, may be configured to cause the client computer and/or browser to request and/or generate a new credential. The one or more new credential-morphing-instructions may be different than one or more previously sent credential-morphing-instructions.

4.10 Validating a Request for Data

Returning now to FIG. 4, in step 460, the intermediary intercepts a request for data. For example, protocol server module 338 may receive a request from browser 295 for data and/or instructions, such as a web page, from web infrastructure 205.

In step 470, the intermediary computer determines whether the request is valid by determining if the credential included in the request, if any, is valid. For example, protocol server module 338 may forward the request to credential validation module 340. Credential validation module 340 may determine whether the credential is valid based on one or more of the methods discussed herein. If credential validation module 340 determines the credential is valid, then control passes to step 490. Otherwise, control passes to step 480. If credential validation module 340 determines that the request does not include a credential, then control may pass to step 480. If credential validation module 340 determines that the request for data includes an initializing credential, then control may pass to step 480.

If configuration 232 includes data indicating that the data requested is public, such as a home page of a web site, then credential validation module 340 may determine that the request is valid, even though the request did not include a credential. In response, control may pass to step 490. If, however, configuration 232 includes data indicating that the data requested is public, but the request includes an invalid credential, then control may pass to step 480.

4.11 Performing a Negative Responsive Action

In step 480, the intermediary computer performs a negative responsive action. For example, credential validation module 340 may terminate the request. Additionally or alternatively, credential validation module 340 may treat the request as a request for an initializing credential, and in response, generate and send the initializing credential and/or seed value to browser 295 via forward transformer 336, as discussed herein in detail. Additionally or alternatively, the intermediary computer 230 may respond with a message defined by a user and/or administrator through a client computer and/or the intermediary computer. Additionally or alternatively, intermediary computer 230 may respond with one or more standard and/or proprietary error codes and/or messages. For example, intermediary computer may return HTTP error code 400 and a message "Bad Request" to browser 295 and/or client computer 299.

4.12 Forwarding the Request to a Server Computer

In step 490, the intermediary computer forwards the request for data to the server computer. For example, credential validation module 340 may pass the request to reverse transformer 342. Reverse transformer 342 may strip out data relating to the credential and produce a new request which would have been generated by browser 295 had the original instructions been received by browser 295. Reverse transformer 342 may send the new request to web infrastructure 205 through protocol client module 332.

If web infrastructure 205 responds to a forwarded request with data and/or instructions, then intermediary computer 230 may repeat one or more of the steps discussed herein. For example, intermediary computer 230 may perform step 410 in response to receiving the new data and/or instructions from web infrastructure 205.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
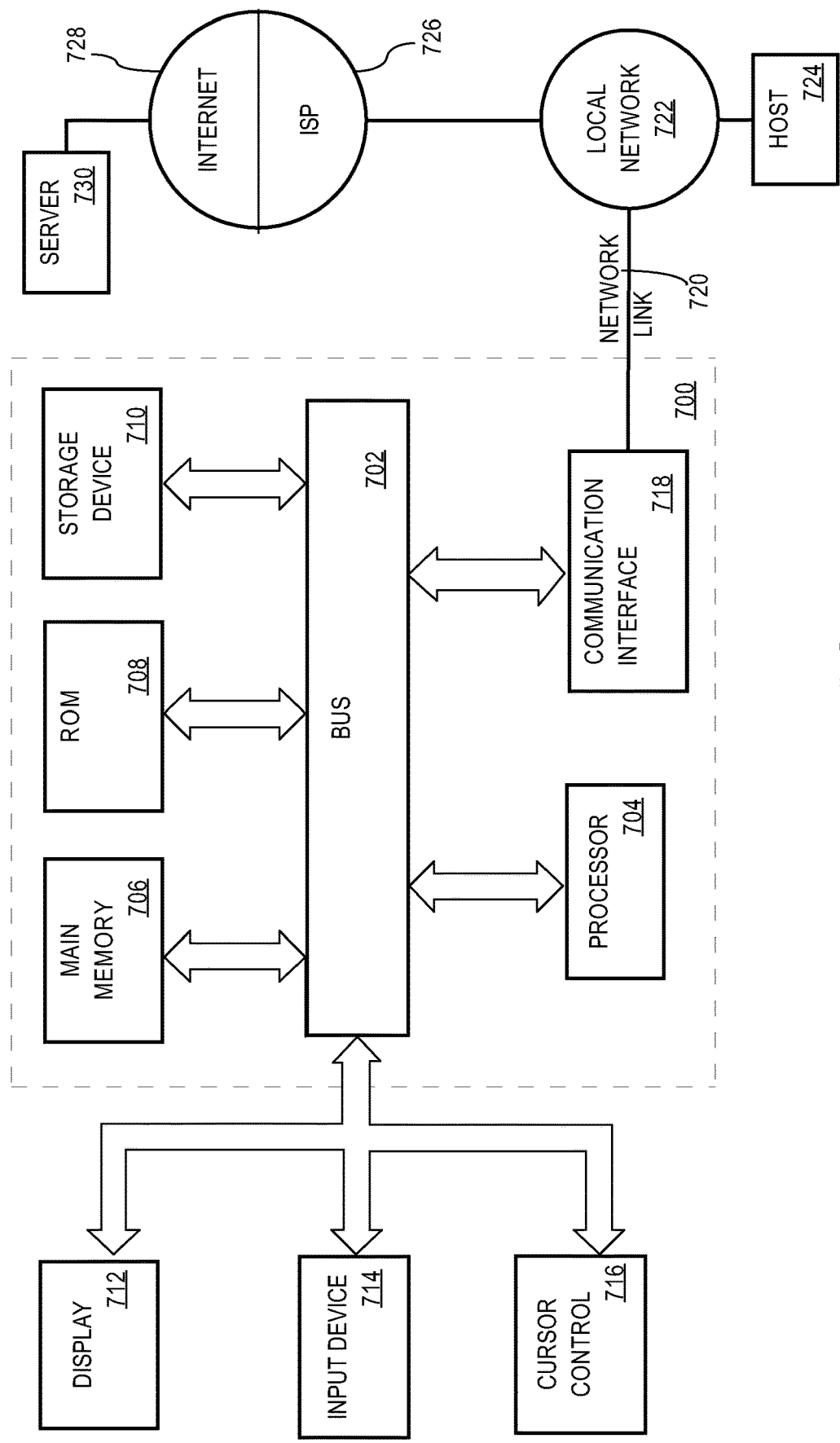
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6.0 Other Aspects of Disclosure

Using the networked computer arrangements, intermediary computer, and/or processing methods described herein, security in client-server data processing may be significantly increased. Dynamic credential techniques discussed herein effectively reduce automated attacks. Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because requests are accompanied by a credential that changes over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a network traffic management system comprising one or more network traffic apparatuses, client devices, or server devices, the method comprising:
generating a dynamic credential to be sent to a client and associating the generated dynamic credential with a parameter;
rendering a credential-morphing instruction and a modified instruction, wherein the credential-morphing instruction defines a credential-morphing operation configured to cause the client to either include a request for a new generated dynamic credential in resource request or update the generated dynamic credential over time when executed to generate a new dynamic credential;
sending the rendered credential-morphing instruction, the modified instruction, and the generated dynamic credential to a client;
receiving a resource request comprising either the dynamic credential, a new dynamic credential generated by a client or a request for a new dynamic credential to be generated, wherein the new dynamic credential is generated and sent back to the client if an associated parameter is satisfied, the new dynamic credential being associated with a new parameter; and
terminating the resource request in response to determining parameter associated with either the dynamic credential or the new dynamic credential is not satisfied.

2. The method of claim 1 further comprising:
receiving a request for data;
determining when the received request includes an invalid credential; and
performing a negative responsive action when the received request is determined to include the invalid credential.

3. The method of claim 1 further comprising:
receiving a request for data comprising the generated dynamic credential or an initialized credential; and
performing a negative responsive action when the received request for data comprises the initialized credential.

4. The method of claim 3, wherein the performing the negative responsive action comprises sending a configurable response that indicates the request was invalid.

5. The method of claim 1 further comprising:
associating the generated dynamic credential with a parameter;
receiving a dynamic credential request for a first request, wherein the first request is for a new dynamic credential, wherein the received dynamic credential request includes the generated dynamic credential;
determining that the parameter associated with the generated dynamic credential is satisfied, and in response:
generating the new dynamic credential;
associating the new dynamic credential with a new parameter;
sending the generated new dynamic credential to the particular computer;
receiving a second request comprising the generated new dynamic credential from the particular computer; and
sending the data to the particular computer in response to determining that the new parameter associated with the generated new dynamic credential is satisfied.

6. The method of claim 1, wherein the generated dynamic credential comprises an encrypted parameter, and the method further comprising:
receiving a first request comprising the generated dynamic credential for a new dynamic credential;
decrypting the encrypted parameter to produce a decrypted parameter;
determining that the decrypted parameter is satisfied, and in response:
generating the new dynamic credential comprising a new encrypted parameter;
sending the generated new dynamic credential to the particular computer;
receiving a second request comprising the generated new dynamic credential from the particular computer for data;
decrypting the encrypted parameter to produce new decrypted parameter; and
sending the data to the particular computer in response to determining that the new decrypted parameter is satisfied.

7. The method of claim 1 further comprising:
receiving a first request comprising the generated dynamic credential for a new dynamic credential, wherein the generated dynamic credential comprises an encrypted parameter;
decrypting the encrypted parameter to produce a decrypted parameter;
determining that the decrypted parameter is satisfied, and in response:
generating the new dynamic credential comprising new encrypted parameter;
sending the new dynamic credential to the particular computer;
receiving a second request comprising the generated new dynamic credential for data;
decrypting the encrypted parameter to produce a new decrypted parameter; and
terminating the received second request in response to determining that the new decrypted parameter is not satisfied.

8. The method of claim 1, wherein the credential-morphing operation is configured to cause the client computer to modify the dynamic credential over time based on a seed value that is sent to the particular computer along with the credential-morphing instruction.

9. The method of claim 1, wherein sending the credential-morphing instruction and the generated dynamic credential to the particular computer comprises:
receiving a request for a web page; and
sending, to the particular computer, the credential-morphing instruction and the dynamic credential along with the web page.

10. A computing apparatus comprising memory comprising programmed instructions stored in the memory and one or more processors configured to be capable of executing the programmed instructions stored in the memory to:
  generate a dynamic credential to be sent to a client and associating the generated dynamic credential with a parameter;
  render a credential-morphing instruction and a modified instruction, wherein the credential-morphing instruction defines a credential-morphing operation configured to cause the client to either include a request for a new generated dynamic credential in resource request or update the generated dynamic credential over time when executed to generate a new dynamic credential;
  send the rendered credential-morphing instruction, the modified instruction, and the generated dynamic credential to a client;
  receive a resource request comprising either the dynamic credential, a new dynamic credential generated by a client or a request for a new dynamic credential to be generated, wherein the new dynamic credential is generated and sent back to the client if an associated parameter is satisfied, the new dynamic credential being associated with a new parameter; and
  terminate the resource request in response to determining parameter associated with either the dynamic credential or the new dynamic credential is not satisfied.

11. The apparatus of claim 10, wherein the one or more processors are further configured to be capable of executing the programmed instructions stored in the memory to provide access to
  receive a request for data;
  determine when the received request includes an invalid credential; and
  perform a negative responsive action when the received request is determined to include the invalid credential.

12. The apparatus of claim 10, wherein the one or more processors are further configured to be capable of executing the programmed instructions stored in the memory to provide access to:
  receive a request for data comprising the generated dynamic credential or an initialized credential; and
  perform a negative responsive action when the received request for data comprises the initialized credential.

13. The apparatus of claim 12, wherein the performing the negative responsive action comprises sending a configurable response that indicates the received request was invalid.

14. The apparatus of claim 10, wherein the one or more processors are further configured to be capable of executing the programmed instructions stored in the memory to provide access to:
  associate the generated dynamic credential with a parameter;
  receive a dynamic credential request for a first request, wherein the first request is for a new dynamic credential, wherein the received dynamic credential request includes the generated dynamic credential;
  determine that the parameter associated with the generated dynamic credential is satisfied, and in response:
  generate the new dynamic credential;
  associate the new dynamic credential with a new parameter;
  send the generated new dynamic credential to the particular computer;
  receive a second request comprising the generated new dynamic credential from the particular computer; and
  send the data to the particular computer in response to determining that the new parameter associated with the generated new dynamic credential is satisfied.

15. The apparatus of claim 10, wherein the one or more processors are further configured to be capable of executing the programmed instructions stored in the memory wherein the generated dynamic credential comprises an encrypted parameter:
  receive a first request comprising the generated dynamic credential for a new dynamic credential;
  decrypt the encrypted parameter to produce a decrypted parameter;
  determine that the decrypted parameter is satisfied, and in response:
  generate the new dynamic credential comprising a new encrypted parameter;
    send the generated new dynamic credential to the particular computer;
    receive a second request comprising the generated new dynamic credential from the particular computer for data;
    decrypt the encrypted parameter to produce a new decrypted parameter; and
    send the data to the particular computer in response to determining that the new decrypted parameter is satisfied.

16. The apparatus of claim 10, wherein the one or more processors are further configured to be capable of executing the programmed instructions stored in the memory to:
  receive a first request comprising the generated dynamic credential for a new dynamic credential, wherein the generated dynamic credential comprises an encrypted parameter;
  decrypt the encrypted parameter to produce a decrypted parameter;
  determine that the decrypted parameter is satisfied, and in response:
    generate the new dynamic credential comprising a new encrypted parameter;
    send the new dynamic credential to the particular computer;
    receive a second request comprising the generated new dynamic credential for data;
    decrypt the encrypted parameter to produce a new decrypted parameter; and
    terminate the received second request in response to determining that the new decrypted parameter is not satisfied.

17. The apparatus of claim 10, wherein the credential-morphing operation is configured to cause the client computer to modify the dynamic credential over time based on a seed value that is sent to the particular computer along with the credential-morphing instruction.

18. The apparatus of claim 10, wherein the one or more processors are further configured to be capable of executing the programmed instructions stored in the memory wherein sending the credential-morphing instruction and the generated dynamic credential to the particular computer comprises:
  receive a request for a web page; and
  send, to the particular computer, the credential-morphing instruction and the dynamic credential along with the web page.

19. A non-transitory computer readable medium having stored thereon instructions comprising executable code which when executed by one or more processors, causes the processors to:
- generate a dynamic credential to be sent to a client and associating the generated dynamic credential with a parameter;
- render a credential-morphing instruction and a modified instruction, wherein the credential-morphing instruction defines a credential-morphing operation configured to cause the client to either include a request for a new generated dynamic credential in resource request or update the generated dynamic credential over time when executed to generate a new dynamic credential;
- send the rendered credential-morphing instruction, the modified instruction, and the generated dynamic credential to a client;
- receive a resource request comprising either the dynamic credential, a new dynamic credential generated by a client or a request for a new dynamic credential to be generated, wherein the new dynamic credential is generated and sent back to the client if an associated parameter is satisfied, the new dynamic credential being associated with a new parameter; and
- terminate the resource request in response to determining parameter associated with either the dynamic credential or the new dynamic credential is not satisfied.

20. A network traffic management system, comprising one or more traffic management apparatuses, client devices, or server devices, the network traffic management system comprising memory comprising programmed instructions stored thereon and one or more processors configured to be capable of executing the stored programmed instructions to:
- generate a dynamic credential to be sent to a client and associating the generated dynamic credential with a parameter;
- render a credential-morphing instruction and a modified instruction, wherein the credential-morphing instruction defines a credential-morphing operation configured to cause the client to either include a request for a new generated dynamic credential in resource request or update the generated dynamic credential over time when executed to generate a new dynamic credential;
- send the rendered credential-morphing instruction, the modified instruction, and the generated dynamic credential to a client;
- receive a resource request comprising either the dynamic credential, a new dynamic credential generated by a client or a request for a new dynamic credential to be generated, wherein the new dynamic credential is generated and sent back to the client if an associated parameter is satisfied, the new dynamic credential being associated with a new parameter; and
- terminate the resource request in response to determining parameter associated with either the dynamic credential or the new dynamic credential is not satisfied.

* * * * *